(12) United States Patent
Ohi et al.

(10) Patent No.: US 7,866,627 B2
(45) Date of Patent: Jan. 11, 2011

(54) NORMALLY-CLOSED ELECTROMAGNETIC VALVE AND MANUFACTURING METHOD FOR THE SAME

(75) Inventors: Takeshi Ohi, Nagano (JP); Takaaki Komaba, Nagano (JP); Hiroaki Tokoi, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 414 days.

(21) Appl. No.: 11/763,244

(22) Filed: Jun. 14, 2007

(65) Prior Publication Data

US 2007/0257222 A1 Nov. 8, 2007

Related U.S. Application Data

(62) Division of application No. 11/092,564, filed on Mar. 29, 2005, now Pat. No. 7,246,632.

(30) Foreign Application Priority Data

| Mar. 30, 2004 | (JP) | .......................... P.2004-098727 |
| Feb. 21, 2005 | (JP) | .......................... P.2005-044407 |
| Mar. 4, 2005 | (JP) | .......................... P.2005-060611 |

(51) Int. Cl.
*F16K 31/02* (2006.01)
(52) U.S. Cl. .............................. 251/129.07; 251/129.15
(58) Field of Classification Search ............ 251/129.07, 251/129.15
See application file for complete search history.

(56) References Cited

U.S. PATENT DOCUMENTS

| 4,313,466 | A | * | 2/1982 | Adams .................. 137/614.17 |
| 4,647,008 | A | * | 3/1987 | Shirai et al. ............ 251/129.07 |
| 5,556,175 | A | | 9/1996 | Hayakawa et al. |
| 5,718,489 | A | | 2/1998 | Megerle et al. |
| 6,092,781 | A | | 7/2000 | Hohl et al. |

(Continued)

FOREIGN PATENT DOCUMENTS

DE 19802464 7/1999

(Continued)

OTHER PUBLICATIONS

English Language Abstract of JP 8-152076.

(Continued)

*Primary Examiner*—John K Fristoe, Jr.
(74) *Attorney, Agent, or Firm*—Andrew M. Calderon; Roberts Mlotkowski Safran & Cole, P.C.

(57) ABSTRACT

A normally-closed electromagnetic valve has a body member having a receiving space, a fixed core, a valve seat, a moving core, a resilient member urging the moving core toward the valve seat, a valve element and a coil exciting the fixed core to produce an attracting force between the fixed core and the moving core, wherein the moving core has a through hole, the valve element is inserted into the through hole from the valve seat-side, at least a part of the resilient member is inserted into the through hole from the fixed core-side and the resilient member is compressed between a moving core-side end of the fixed core and a fixed core-side end of the valve seat.

18 Claims, 7 Drawing Sheets

U.S. PATENT DOCUMENTS

| | | |
|---|---|---|
| 6,409,145 B1 | 6/2002 | Fong et al. |
| 6,778,051 B2 | 8/2004 | Shirase et al. |
| 7,240,893 B2 * | 7/2007 | Komaba et al. ........ 251/129.04 |
| 7,246,632 B2 * | 7/2007 | Ohi et al. ................. 137/15.18 |
| 2002/0026827 A1 | 3/2002 | Fong et al. |
| 2004/0144870 A1 | 7/2004 | Tani et al. |
| 2005/0178991 A1 * | 8/2005 | Goossens et al. ....... 251/129.07 |

FOREIGN PATENT DOCUMENTS

| | | |
|---|---|---|
| DE | 19836494 | 10/1999 |
| DE | 10064169 | 2/2002 |
| DE | 10254342 | 11/2003 |
| EP | 0670445 | 9/1995 |
| JP | 8-152076 | 6/1996 |
| JP | 2000-193121 | 7/2000 |
| JP | 2000-240826 | 9/2000 |
| JP | 3444151 | 6/2003 |
| JP | 2004-506573 | 3/2004 |
| WO | 97/28999 | 8/1997 |
| WO | 02/16180 | 2/2002 |

OTHER PUBLICATIONS

English Translation of Japanese Office Action, May 29, 2008.

* cited by examiner

NORMALLY-CLOSED ELECTROMAGNETIC VALVE AND MANUFACTURING METHOD FOR THE SAME

CROSS REFERENCE TO RELATED APPLICATIONS

The present application is a divisional application of copending U.S. patent application Ser. No. 11/092,564, filed on Mar. 29, 2005, the contents of which are expressly incorporated herein in their entirety. The present invention also claims foreign priority to Japanese patent application no. P.2004-098727, filed on Mar. 30, 2004, P.2005-044407 filed on Feb. 21, 2005 and P2005-060611 filed on Mar. 4, 2005, the contents of which are incorporated herein by reference.

BACKGROUND OF THE INVENTION

1. Field of the Invention

This invention relates to a normally-closed electromagnetic valve in which a moving core is urged toward a valve seat, so that a valve element which is movable forward and backward together with the moving core abuts against the valve seat to thereby achieve a valve-closed condition. The present invention also relates to a manufacturing method for the normally-closed electromagnetic valve.

2. Description of the Related Art

There is known a normally-closed electromagnetic valve working that a moving core is urged by a resilient member such as a spring so that a valve element, which is provided at a distal end portion of the moving core, abuts against a valve seat to thereby achieve a valve-closed condition, and exciting a core by an energization coil so that the moving core is attracted toward the fixed core by an electromagnetic attracting force thereof to thereby achieve a valve-open condition (see Japanese Patent Unexamined Publication no. JP-A-8-152076).

In such a normally-closed electromagnetic valve, the urging force, applied to the moving core from the resilient member, is an important element for determining the valve-closing force of the electromagnetic valve. Therefore, when there is a variation in characteristics of the resilient member used in the normally-closed electromagnetic valve, a variation develops in the urging force of the resilient member in the closed condition of the valve. Namely, at the time of energization (excitation), a variation develop in the electromagnetic attracting force required for opening the valve against the bias of the resilient urging force, and at the time of de-energization (excitation), a variation develops in the valve-opening force (valve opening characteristics) for opening the valve against the bias of the resilient member, and this leads to a variation in pressure regulation control characteristics. Thus, the variation in the characteristics of the resilient member has been a hindrance to the enhanced precision of the pressure regulation control.

In the normally-closed electromagnetic valve, it is required that a flow rate or a pressure differential at the time of opening the valve should be set to a target value. Therefore, in the production of the normally-closed electromagnetic valve, it is required that a load, which is applied from a spring so as to close the valve, and an electromagnetic attracting force should be set to a predetermined value.

However, it is difficult to eliminate a manufacturing tolerance and an assembling error with respect to all of the component parts. On the other hand, even when there are a variation in the load applied from the spring and a variation in electromagnetic attracting force, the flow rate or the pressure differential at the time of opening the valve can be set to a target value by adjusting a stroke of a moving core. See Japanese Patent Examined Publication JP-B-3,444,151 and Japanese Patent Unexamined Publication JP-A-2004-506573

SUMMARY OF THE INVENTION

The present invention has been made in view of the above circumstances, and the present invention is to provide a normally-closed electromagnetic valve which is much less affected by a variation in characteristics of a resilient member, and also to provide a manufacturing method for the valve.

Further, the present invention provides a manufacturing method for a normally-closed electromagnetic valve in which a flow rate or a pressure differential at the time of opening the valve is set to a target value.

According to a first aspect of the present invention, there is provided a normally-closed electromagnetic valve comprising:

a body member having a receiving space extending therethrough;

a fixed core mounted to the body member so as to close one end portion of the receiving space;

a valve seat fixed to the other end portion of the receiving space;

a moving core opposing to the fixed core and sliding within the receiving space;

a resilient member urging the moving core toward the valve seat;

a valve element which is mounted on the moving core so as to move forward and backward together therewith, and is capable of abutting against the valve seat; and a coil exciting the fixed core so as to produce an attracting force between the fixed core and the moving core, wherein the moving core has a through hole extending therethrough from a fixed core-side thereof to a valve seat-side thereof, the valve element is inserted into the through hole from the valve seat-side and is press-fitted thereto, at least a part of the resilient member is inserted into the through hole of the moving core from the fixed core-side, and the resilient member is compressed between a moving core-side end of the fixed core and a fixed core-side end of the valve seat.

In the present invention, the through hole is formed in the moving core in which the valve element is press-fitted, and therefore even when there is a variation in characteristics of the resilient member to be used, the inserting length of the valve element in the moving core is adjusted, and by doing so, the influence of the variation of the characteristics of the resilient member can be reduced, and besides the precision of a pressure regulation control can be enhanced.

According to a second aspect of the present invention, as set forth in the first aspect of the present invention, it is preferable that an urging force of the resilient member to the moving core in accordance with characteristics of the resilient member is applied a predetermined value by an inserting length of the resilient member.

Note that the characteristics of the resilient member means like elastic modulus which directly or indirectly affect the urging force loading to the moving core, for example, spring constant when adapting spring as the resilient member. With this construction, the influence of the variation of the characteristics of the resilient member can be eliminated by adjusting the inserting length of the valve element at the production stage.

According to a third aspect of the present invention, as set forth in the first aspect of the present invention, it is preferable that the moving core has a resilient member receiving portion into which the resilient member is inserted from the fixed-core side; and the valve element has a communication portion which communicates the valve-seat side and the fixed core-side of the moving core with each other.

In the normally-closed electromagnetic valve, the moving core is often provided with a mechanism by which a valve seat-side and a fixed core-side of the moving core communicate with each other so as to eliminate a pressure differential between the fixed core-side and the valve seat-side. In a conventional construction, a groove is formed in an outer periphery of the moving core, or a through hole designed for this special purpose is formed in the interior of the moving core. With such a construction, however, the area of opposed portions of the moving core and fixed core is reduced. Therefore, according to the present invention, the communication portion is formed in the valve element, and cooperates with the resilient member-receiving portion to communicate the fixed core-side and valve-seat side of the moving core with each other. In this construction, a groove or a through hole for exclusive use as a communication passage of a fluid does not need to formed in the moving core, and therefore the area of the opposed portions of the moving core and fixed core can be increased. As a result, an electromagnetic attracting force, acting between the moving core and the fixed core during the valve-opening operation of the electromagnetic valve, can be increased, and a compact design of the energizing coil and a low-power consumption design of the electromagnetic valve can be achieved.

According to a fourth aspect of the present invention, as set forth in the first aspect of the present invention, it is preferable that in a valve-closed condition in which the valve element abuts against the valve seat, a flow passage in which fluid flows in a direction opposite to an urging direction of resilient member is shut off.

In this flow passage of the fluid, a variation in the urging force of the resilient member much affects the pressure regulation control characteristics, and therefore by adjusting the inserting length of the valve element in the moving core, the pressure regulation control characteristics can be greatly improved.

According to a fifth aspect of the present invention, there is provided a manufacturing method for a normally-closed electromagnetic valve, the normally-closed electromagnetic valve including:

a moving core disposed between a fixed core fixed to a body member and a valve seat;

a valve element being capable of abutting against the valve seat and reciprocatably sliding within the fixed core and the body member; and a resilient member urging the moving core to a valve seat side together with the valve element, wherein the moving core has a through hole which penetrates from the fixed core side to the valve seat side, the manufacturing method comprising the steps of:

press-fittingly inserting the valve element into a through hole in the moving core with adjusting an inserting length of the valve element so that an urging force thereof becomes predetermined value, in a state that the resilient member is inserted into the through hole;

calculating an inserting length of the fixed core by a predetermined stroke of the moving core and the inserting length of the valve element; and inserting the fixed core into a receiving space of the body member in accordance with the calculated inserting length of the fixed core so as to be tightly fitted to the body member.

In the present invention, in the step of fixedly press-fitting the valve element into the moving core and in the step of inserting the fixed core into the body member and fixing the fixed core thereto, the inserting length of the valve element and the inserting length of the fixed core are adjusted in accordance with the resilient characteristics of the resilient member. Accordingly, the influence of the variation of the characteristics of the resilient member which could not be adjusted only by improving the precision of working of the parts can be reduced. Therefore, in the present invention, the urging force applied to the moving core can be set to the predetermined value, and there can be produced the normally-closed electromagnetic valve in which the precision of the pressure regulation control can be enhanced. And besides, it has heretofore been necessary to prepare the energizing coil of a large size for producing an electromagnetic attracting force, beforehand taking a variation in characteristics of the resilient member into consideration, in order to secure a sufficient output margin of the energizing coil. However, in the present invention, the urging force of the resilient member is set to the predetermined value at the stage at which the parts are assembled together, and therefore the energizing coil can be formed into a compact size.

According to a sixth aspect of the present invention, there is provided a manufacturing method for a normally-closed electromagnetic valve, the electromagnetic valve including:

a body member having a receiving space and communication holes communicating with the receiving space;

a moving core disposed within the receiving space so as to move in an axial direction of the receiving space;

a valve seat which has a flow hole constituting a part of a flow passage of a fluid circuit, and is accommodated within the receiving space of the body member so as to be fixed to the body member;

a valve element fixed to an end portion of the moving core, and located in the flow passage for closing the flow hole;

a resilient member urging the valve element toward the valve seat; and a fixed core fixed to an end portion of the body, wherein the moving core to which the valve element is fixed and the resilient member are disposed in the receiving space of the body member so that the valve element is sandwiched between the valve seat and the resilient member, the manufacturing method comprising the steps of:

press-fitting the fixed core into the receiving space of the body member so as to oppose to the moving core and the resilient member;

locating the moving core and the fixed core within a magnetic circuit;

applying a magnetic field by the magnetic circuit to generate electromagnetic attracting force so that the moving core together with the valve element are attracted toward the fixed core and separating the valve element from the valve seat; and detecting a physical quantity of the fluid and controlling an inserting length of the fixed core while applying fluid to the flow passage so as to flow pass through the communicating hole and the flow hole in such a manner that:

inserting the fixed core further toward the valve element against the urging force of the resilient member when the detected physical quantity still surpasses or under runs a predetermined value; and stopping to insert the fixed core when the detected physical quantity reaches the predetermined value.

According to a seventh aspect of the present invention as set forth in the sixth aspect of the present invention, it is preferable that the physical quantity of the fluid is flow rate detected at the communicating hole or the flow hole, and the controlling of the inserting length of the fixed core step is performed such that:
   inserting the fixed core further toward the valve element against the urging force of the resilient member when the detected flow rate still surpasses the predetermined value; and
   stopping to insert the fixed core when the detected flow rate reaches the predetermined value.

According to an eighth aspect of the present invention as set forth in the sixth aspect of the present invention, it is preferable that the physical quantity of the fluid is pressure differential of the fluid, which is defined between an upstream region and a downstream regions of the flow hole, and the controlling of the inserting length of the fixed core step is performed such that:
   inserting the fixed core further toward the valve element against the urging force of the resilient member when the detected pressure differential still under runs the predetermined value; and
   stopping to insert the fixed core when the detected pressure differential reaches the predetermined value.

In the present invention, even when there are a variation in the load applied from the resilient member and a variation in electromagnetic attracting force because of a manufacturing tolerance of the parts or an error in the assembling of the parts, the flow rate or the pressure differential at the time of opening the valve can be set to the target value, and therefore the precision of the electromagnetic valve can be kept to a predetermined level.

According to a ninth aspect of the present invention as set forth in the sixth aspect of the present invention, it is preferable that the moving core has a through hole and the manufacturing method further comprises a step of fixing the valve element to the moving core comprising the steps of:
   press-fitting the valve element into the through hole;
   inserting the resilient member into the through hole; and
   detecting load applied by the compressed resilient member and controlling an inserting length of the valve element while inserting the valve element into the through hole so that the resilient member is compressed in such a manner that:
      continuing to insert the valve element when the detected load under runs a predetermined value; and
      stopping to insert the valve element when the detected load reached the predetermined value.

According to the present invention, even when there is a manufacturing tolerance of the parts or an error in the assembling of the parts, the load applied from the resilient member can be set to the target value, and therefore the precision of the electromagnetic valve can be kept to a predetermined level.

According to a tenth aspect of the present invention as set forth in the sixth aspect of the present invention, it is preferable that after stopping to insert the valve element, the fixed core is fixedly secured to the body member by welding.

DETAILED DESCRIPTION OF THE PREFERRED EMBODIMENTS

A preferred embodiment of the present invention will now be described with reference to the drawings.

Figure 1:
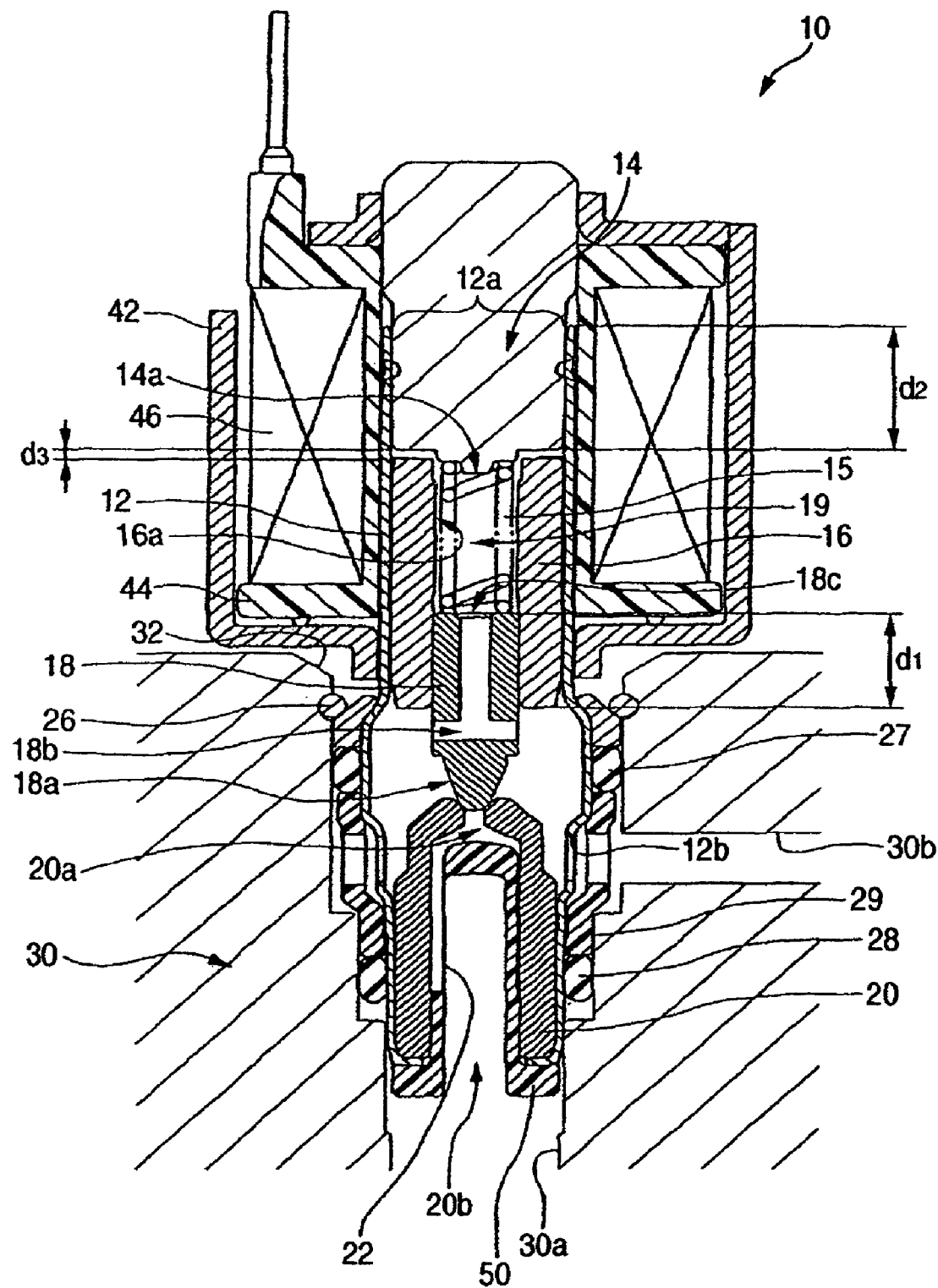
FIG. 1 is a cross-sectional view schematically showing a preferred embodiment of a normally-closed electromagnetic valve of the present invention.

FIG. 1 is a cross-sectional view schematically showing a normally-closed electromagnetic valve 10 of the present invention.

The normally-closed electromagnetic valve 10 of this embodiment is mounted on a hydraulic control apparatus such as, for example, an anti-lock brake control apparatus for a vehicle, and is used for controlling a hydraulic pressure of a fluid of a brake.

As shown in FIG. 1, the normally-closed electromagnetic valve 10 is fitted in a mounting hole 32, formed in a base body 30 of the vehicle anti-lock brake control apparatus or the like, through seal members 27 and 28 (each in the form of an O-ring) and a stopper member 29, and is fixed to this mounting hole 32 by an annular retaining member 26. A first fluid passageway 30a, serving also as the mounting hole 32, is formed in the base body 30, and extends in a direction of fitting of the normally-closed electromagnetic valve 10 in the mounting hole 32, and a second fluid passageway 30b is provided between the seal members 27 and 28.

In the vehicle anti-lock brake control apparatus having the normally-closed electromagnetic valve 10 mounted thereon, the fluid of the brake flows from the first fluid passageway 30a in the base body 30, and in a valve-open condition, the first fluid passageway 30a communicates with the second fluid passageway 30b, so that the fluid flows into the second fluid passageway 30b. Also, there can be used an arrangement in which the fluid flows from the second fluid passageway 30b into the first fluid passageway 30b via a space within a valve seat 20. In this anti-lock brake control apparatus, the normally-closed electromagnetic valve 10, provided between the first and second fluid passageways 30a and 30b, serves as part of a path of flow of the fluid.

More specifically, in the case where the fluid flows into the electromagnetic valve 10 from the first fluid passageway 30a, this fluid first flows into a receiving space 12a of a body member 12 from an open end thereof through the internal space of the valve seat 20 extending from a second opening portion 20b thereof to a first opening portion 20a thereof, and then the fluid flows into the second fluid passageway 30b via an inflow/discharge port 12b and an opening formed in the stopper member 29. In the normally-closed electromagnetic valve 10, the first opening portion 20a of the valve seat 20 is opened and closed by a valve element 18 so as to control the pressure of the fluid. In the normally-closed electromagnetic valve 10 of this embodiment, there can also be adopted an arrangement in which the fluid flows into the internal space of the valve from the second fluid passageway 30b, and is discharged to the first fluid passageway 30a. In this case, within the normally-closed electromagnetic valve 10, the working fluid flows along a flow path reverse to the above-mentioned flow path. Preferably, the normally-closed electromagnetic valve of this embodiment is so mounted on the hydraulic control apparatus that the fluid flows into the internal space of the valve from the first fluid passageway 30a, and is discharge to the second fluid passageway 30b. In other words, preferably, in the closed condition of the normally-closed electromagnetic valve 10 in which the valve element 18 abuts against the valve seat 20, the flow passage, in which the fluid flows in a direction opposite to the direction of urging of a moving core 16 by a spring member 15, is shut off. In the flow passage in which the fluid flows from the first fluid passageway 30a to the second fluid passageway 30b, a variation in the urging force of the spring member 15 much affects the pressure regulation control characteristics of the electromagnetic valve. Therefore the inserting length of the valve element 18 into the moving core 16 is adjusted as described later. Accordingly, the regulation pressure control characteristics of the valve can be markedly improved.

In the normally-closed electromagnetic valve 10 of this embodiment, a filter element 22 is provided in the first fluid passageway 30a so as to prevent impurities, included in the fluid of the brake, from flowing into the interior of the electromagnetic valve 10. In the case where the electromagnetic valve is used in such a condition that the fluid flows into the internal space of the valve from the second fluid passageway 30b, the stopper member 29, having the opening corresponding to the second fluid passageway 30b, can be designed to have a filter function.

A holder 50 for holding the filter 22 is inserted into the flow hole 20a from an opening thereof communicating with the second communication hole 12c, and is mounted in this flow hole 20a. The flow hole 20a is also open to a valve seat surface 20c, and communicates with an internal space of a body member 12.

Next, the internal structure of the normally-closed electromagnetic valve 10 of this embodiment will be described specifically.

The normally-closed electromagnetic valve 10 includes the body member 12 of a generally cylindrical shape made of a non-magnetic material. The body member 12 has the receiving space 12a extending therethrough from one end thereof to the other end thereof. A fixed core 14 made of a magnetic material is fixedly secured to the one end portion of the body member 12, for example, by welding to close this one end portion. The body member 12 is not limited to the cylindrical shape, and can be replaced by a housing in so far as the housing has a through hole (serving as the receiving space 12a) for receiving the moving core 16 and the valve seat 20 (described later) therein. However, in order to achieve a compact design of the normally-closed electromagnetic valve 10, it is preferred to use the cylindrical body member having a thin peripheral wall. Such body member 12 can be formed, for example, by drawing.

The moving core 16 made of a magnetic material is fitted in the receiving space 12a. The moving core 16 has a through hole 16a extending therethrough from its fixed core-side end, disposed close to the fixed core 14, to its valve seat-side end disposed close to the valve seat 20. The valve element 18 is press-fitted in the valve seat-side end portion of the through hole 16a disposed close to the valve seat 20, and is fixed thereto.

In this embodiment, a spring receiving portion 19 is formed by part of the through hole 16a in the moving core 16 and an end surface 18c of the valve element 18 (press-fitted in the through hole 16a) facing the fixed core 14, and at least part of the spring member 15, urging the moving core 16 toward the valve seat 20, is received in this spring receiving portion 19. The spring member 15 is contracted or compressed between an end 14a of the fixed core 14 and the end portion 18c of the valve element 18 (fixedly press-fitted in the through hole 16a of the moving core 16) facing the fixed core 14. Namely, the end portion 18c of the valve element 18, fixedly press-fitted in the moving core 16, receives a load from the spring member 15, so that the moving core 16, while urged toward the valve seat 20, can slidingly move a predetermined stroke (stroke length) d3 between the fixed core 14 and the valve seat 20 in the receiving space 12a.

In this embodiment, thus, the through hole 16a is formed in the moving core 16, and the valve element 18 is fixedly press-fitted in the through hole 16a in the moving core 16 to form the spring receiving portion 19. Therefore, even when there is a variation in characteristics of the spring member 15, the amount d1 of press-fitting of the valve element 18 in the through hole 16a in the moving core 16 is adjusted, and by doing so, the amount of compression of the contracted spring member 15 can be adjusted, thereby reducing the influence of the variation of the above characteristics. Namely, in the normally-closed electromagnetic valve 10 of this embodiment, the urging force, applied by the spring member 15, can be set to a predetermined value, so that the precision of the pressure regulation control can be enhanced.

Particularly in this embodiment, the valve element 18 is press-fitted in the through hole 16a in the inserting length d1 corresponding to a spring constant (one example of resilient characteristics) of the spring member 15 so that the urging force, applied from the spring member 15 to the moving core 16, can be set to the predetermined value. With this construction, a variation of the urging force in the valve-closed condition due to the variation in the characteristics of the spring member 15 can be eliminated by adjusting the amount d1 of press-fitting of the valve element 18. At this time, the amount d2 of insertion of the fixed core 14 in the body member 12 is determined according to the amount d1 of press-fitting of the valve element 18.

The valve element 18 moves forward and backward within the receiving space 12a, and an abutment portion 18a, formed at a distal end of the valve element 18, can be brought into abutting engagement with the first opening portion 20a of the valve seat 20, fixed to the end portion of the body portion 12, to close the normally-closed electromagnetic valve 10.

A communication portion 18b through which the fixed core (14)-side and valve seat (20)-side of the moving core 16 in the internal space 12 communicate with each other is formed in the valve element 18, and with this construction a pressure differential (which would otherwise be produced by the fluid filled in the space between the moving core 16 and the valve seat 20) is prevented from developing between the fixed core (14)-side and valve seat (20)-side of the moving core 16, so that the moving core 16 can be smoothly moved forward and backward. In the normally-closed electromagnetic valve 10 shown in FIG. 1, the spring receiving portion 19 serves not only as the space receiving the spring member 15 but also as the space for eliminating a pressure differential between the moving core 16 and the valve seat 20. In this construction, when the communication portion 18b is formed in the valve element 18, the valve seat (20)-side of the moving core 16 can communicate with the spring receiving portion 19 (provided at that side of the moving core 16 facing the fixed core 14) via the communication portion 18b, so that a pressure differential between the fixed core (14)-side and valve seat (20)-side of the moving core 16 is eliminated, and besides the area of each of the opposed portions of the moving core 16 and fixed core 14 can be increased. As a result, an electromagnetic attracting force, acting between the moving core 16 and the fixed core 14 in the valve-opening operation, can be increased, and therefore a compact design of a coil 46 and a low-power consumption design of the normally-closed electromagnetic valve 10 can be achieved. The communication portion 18b can be in the form of a hole formed in the interior of the valve element 18 or in the form of a groove formed in the outer peripheral surface of the valve element 18.

The valve seat 20 is received in the receiving space 12a of the body member 12, and is fixedly press-fitted in that open end portion of the body member 12 opposite to the end portion thereof closed by the fixed core 14. The valve seat 20 has the first opening portion 20a and the second opening portion 20b, and a communication space which extends from the first opening portion 20a to the second opening portion 20b forms part of the path of flow of the fluid. The first opening portion 20a is opened and closed by the abutment portion 18a of the valve element 18. The second opening portion 20b is open to the first fluid passageway 30a, and is normally open, and serves as an inflow port or a discharge port for the fluid.

A coil casing 42 is mounted around the outer periphery of the body member 12 and the outer periphery of the fixed core 14. The coil casing 42 is mainly made of a magnetic material, and a bobbin 44, having the coil 46 wound therearound, is received within the coil casing 42.

Also, the electromagnetic valve 10 includes the coil 46 comprising a conductor wire. The coil 46 is wound around a bobbin 44 made of an insulate material (such as a resin, for example). When an electric current flows through the coil 46, a magnetic field is produced. A coil casing 42 made of a magnetic material (or a ferromagnetic material) is disposed within this magnetic field, and an efficient magnetic circuit, passing through the coil casing 42, can be formed. The coil casing 42 serves also as a cover for the coil 46. A moving core 16 and a fixed core 14 (or at least part thereof are disposed within the magnetic filed produced by the coil 46 or within the magnetic circuit formed through the coil casing 42.

In the normally-closed electromagnetic valve 10 of this embodiment, when the coil 46 is energized to excite the fixed core 14, an electromagnetic attracting force, attracting the moving core 16 toward the fixed core 14, is produced. As a result, the moving core 16, while guided by the inner surface of the body member 12, slides the predetermined stroke d3 between the fixed core 14 and the valve seat 20 in the receiving space 12a. Namely, in the de-excited condition of the coil 46, the moving core 16 effects the valve-closing operation under the influence of the spring member 15. When the fixed core 14 is excited by the coil 46, the moving core 16 effects the valve-opening operation by the electromagnetic attracting force attracting this moving core 16 toward the fixed core 14. The valve-opening and valve-closing operations of the normally-closed electromagnetic valve 10 are achieved respectively by opening and closing the first opening portion 20a of the valve seat 20 by the abutment portion 18a of the valve element 18.

In the case where a fluid flows from the flow hole 20a of a valve seat 20 toward a valve element 18, the pressure within the flow hole 20a is higher than the pressure outside the flow hole 20a (that is, outside the flow hole 20a in a downstream direction toward the valve element 18). Therefore, a fluid pressure, tending to move the valve element 18 in a direction away from the valve seat 20, is applied to this valve element 18. When the sum of the fluid pressure and an electromagnetic attracting force exceeds a resilient force of a resilient member 15, the flow hole 20a is opened.

Next, a manufacturing method for the normally-closed electromagnetic valve 10 of this embodiment will be described.

The manufacturing method for the normally-closed electromagnetic valve 10 of this embodiment is characterized in that at the time of mounting the associated parts on the body member 12, the amount d1 of press-fitting of the valve element 18 in the through hole 16a in the moving core 16 is adjusted according to the characteristics of the spring member 15, thereby setting the urging force of the spring member 15 to the predetermined value. More specifically, this can be achieved in the following manner.

Figure 2:
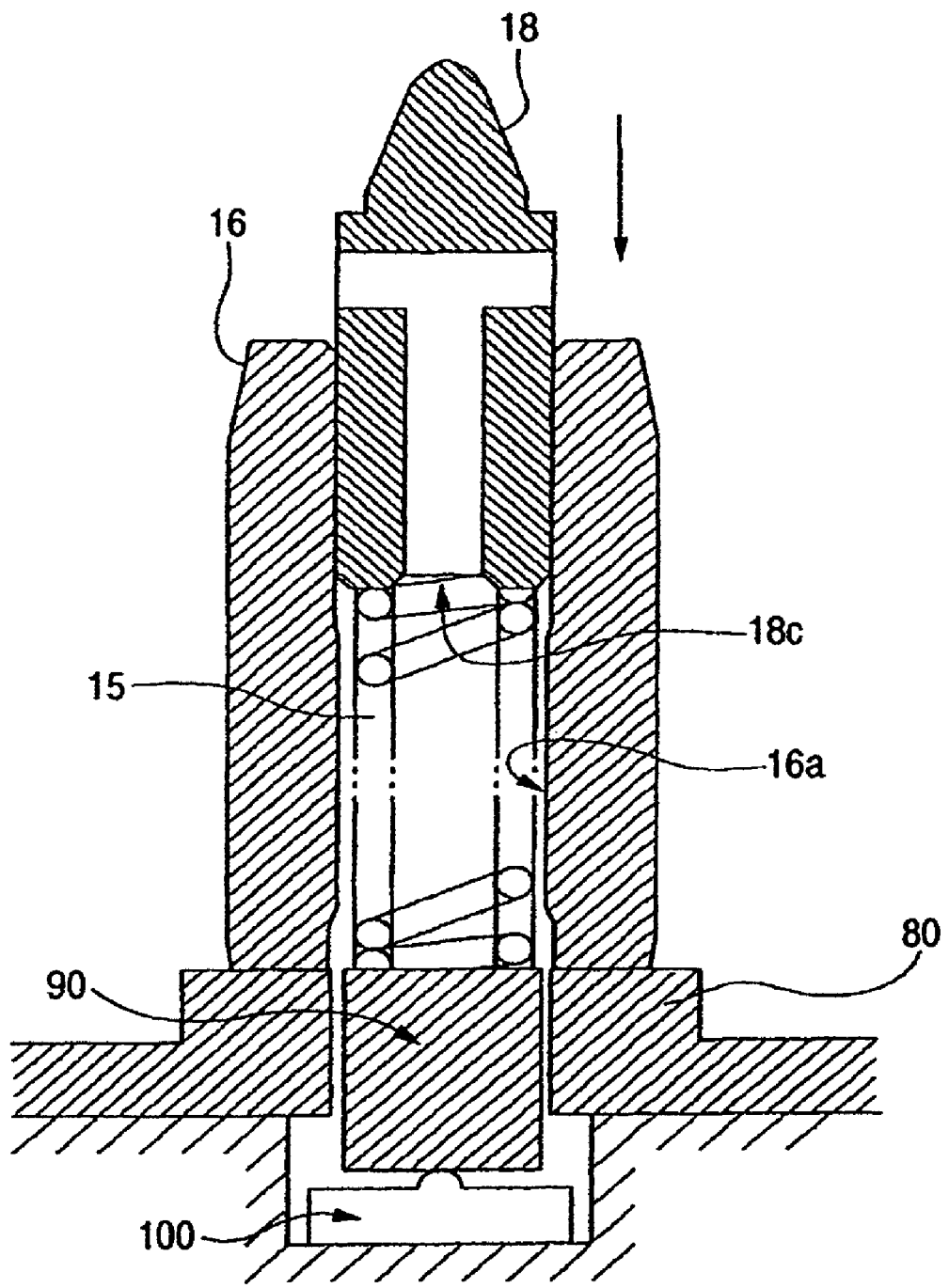
FIG. 2 is a cross-sectional view schematically showing a process of producing the normally-closed electromagnetic valve of the above embodiment.
Figure 3:
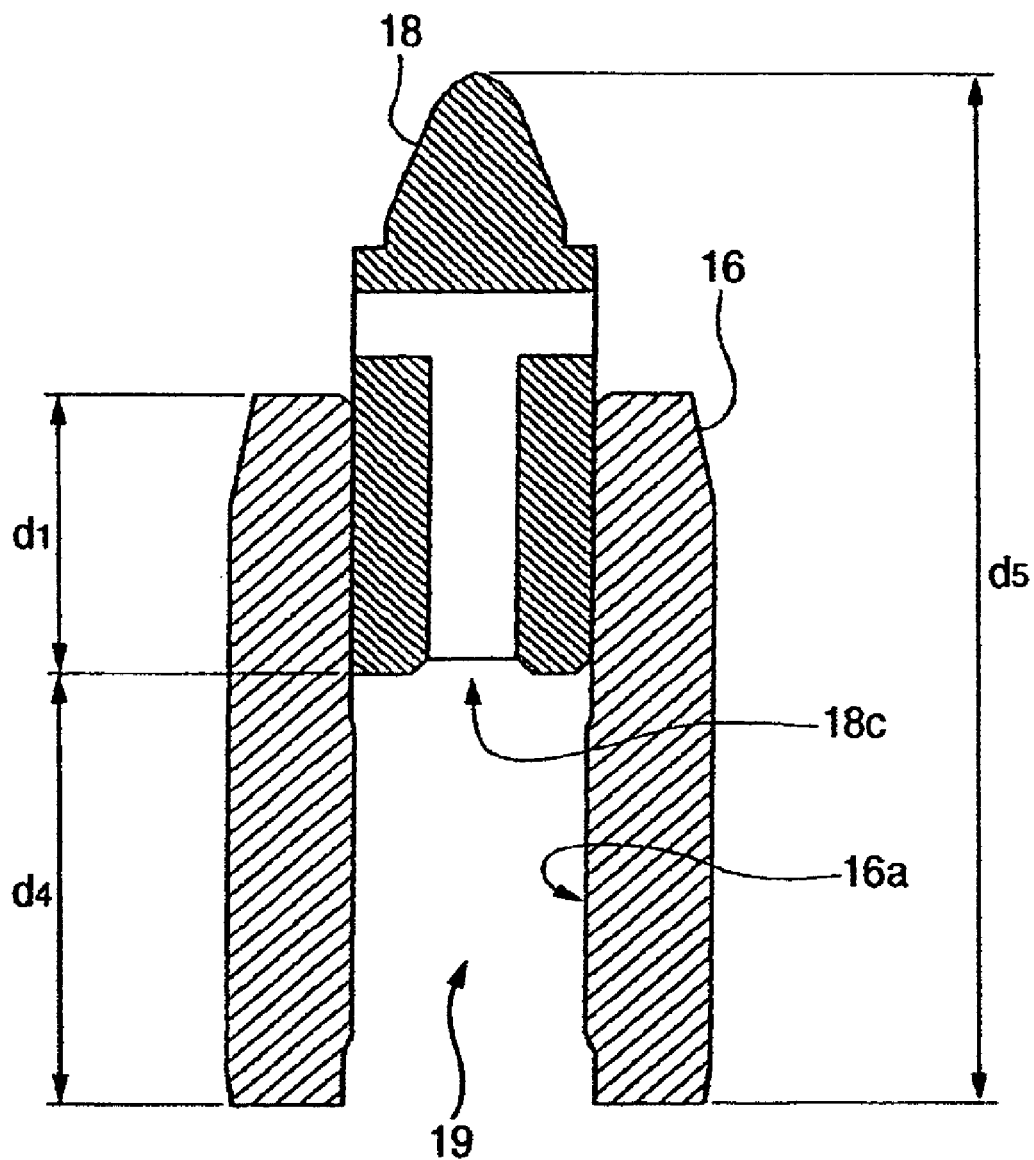
FIG. 3 is a cross-sectional view schematically showing a process of producing the normally-closed electromagnetic valve of the above embodiment.
Figure 4:
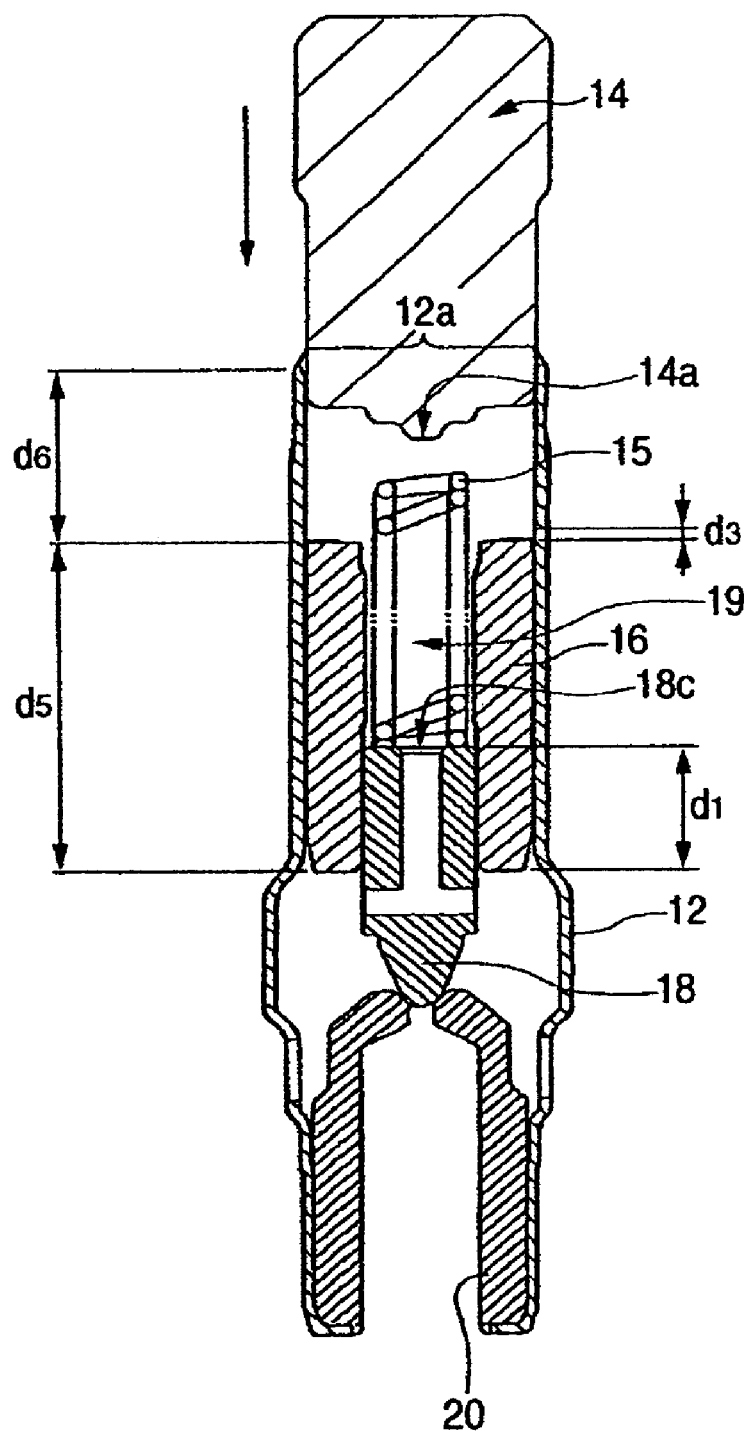
FIG. 4 is a cross-sectional view schematically showing a process of producing the normally-closed electromagnetic valve of the above embodiment.
Figure 5:
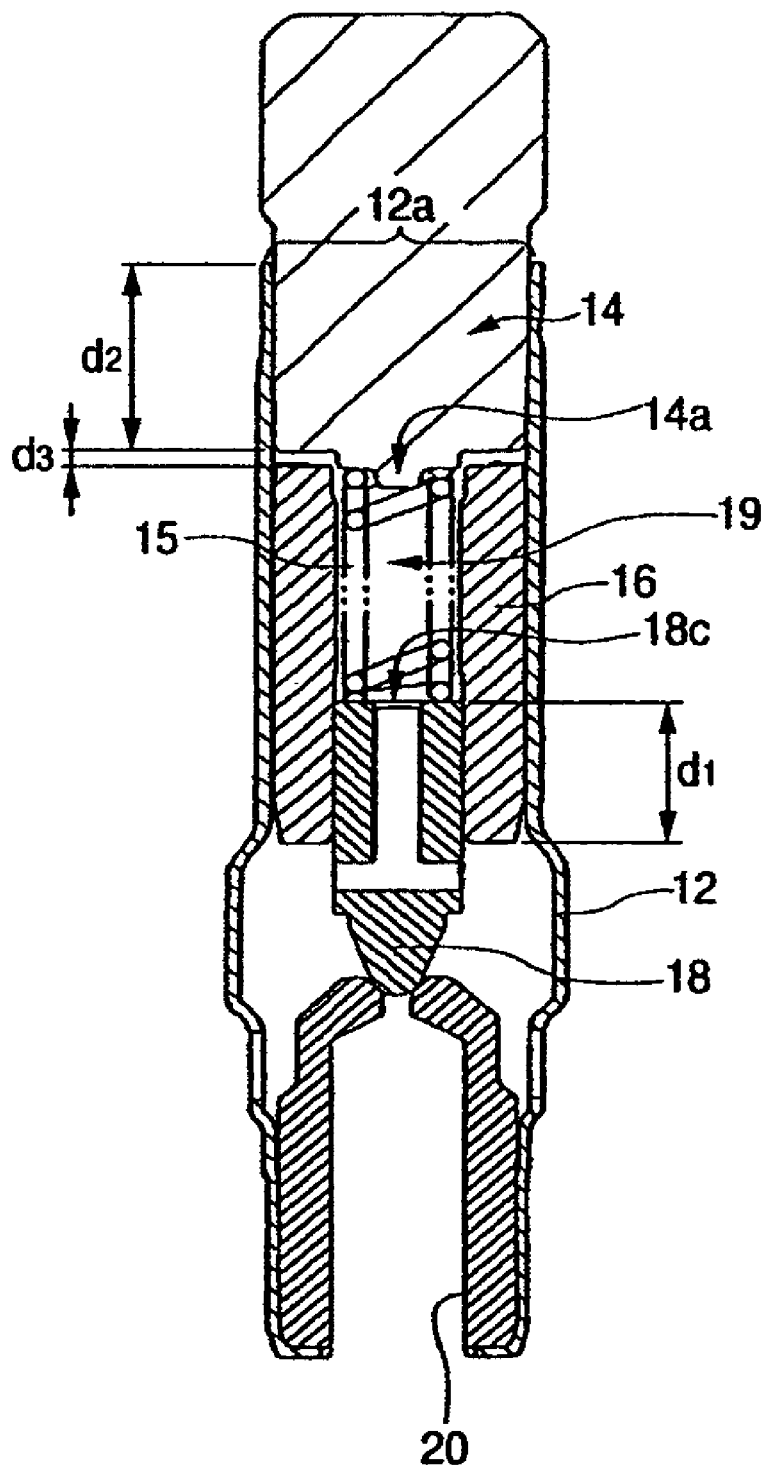
FIG. 5 is a cross-sectional view schematically showing a process of producing the normally-closed electromagnetic valve of the above embodiment.

First, there is effected a step in which the valve element 18 is press-fitted into the through hole 16a in the moving core 16, and is fixed thereto, thereby providing a unit. In this step, the spring member 15 is inserted in the through hole 16a in the moving core 16 as shown in FIG. 2, and in this condition the open-side end of the moving core 16 is placed on a press-fitting load-receiving member 80, and the valve element 18 is press-fitted into the through hole 16a in the moving core 16 from the other end thereof. At this time, the spring member 15 is pressed by the valve element 18, and presses a pin 90 downward, and the press-fitting of the valve element 18 is carried out while monitoring the urging force of the spring member 15 by a load sensor 100 disposed at a lower end of the pin 90. Then, when the urging force of the spring member 15 reaches the predetermined value with a inserting length d1 as shown in FIG. 3, the press-fitting of the valve element 18 is finished.

In the production method of this embodiment, the amount d1 of press-fitting of the valve element 18 varies according to the characteristics of the spring member 15 to be used, and therefore a depth d4 of the spring receiving portion 19 formed by the through hole 16a of the moving core 16, as well as a length d5 from the open end of the through hole 16a of the moving core 16 to the distal end of the valve element 18, varies.

Therefore, in this embodiment, the amount d2 of insertion of the fixed core 14 is determined in association with the predetermined stroke length d3 of the moving core 16 (i.e., a distance over which the moving core 16 can slide) and the amount d1 of press-fitting of the valve element 18 in the through hole 16a of the moving core 16. Namely, in this embodiment, the inserting length d2 of the fixed core 14 is determined on the basis of the fixed stroke length d3 of the moving core 16 and the dimension varying with the inserting length d1 of press-fitting of the valve element 18, and by doing so, the urging force of the spring member 15 can be set to the predetermined value.

Specifically, as a first example, the valve seat 20 is press-fitted in the body member 12, and in this condition the moving core 16 (having the valve element 18 press-fitted in the through hole 16a in such a manner that the valve element 18 can abut against the valve seat 20) is inserted into the body member 12, and in this condition the amount d2 of insertion of the fixed core 14 can be determined on the basis of a depth d6 from the open end of the through hole 16a of the moving core 16 to the open end of the receiving space 12a and the stroke length d3 of the moving core 16.

As a second example, the valve element 18 is press-fitted in the through hole 16a of the moving core 16, and in this condition the inserting length d2 of the fixed core 14 can be determined on the basis of the length d5 from the open end of the through hole 16a of the moving core 16 to the distal end of the valve element 18 and the predetermined stroke length d3 of the moving core 16.

Summarizing the first and the second examples, when determining the inserting length d1 of the valve element 18, the length d5, which is defined from the open end of the through hole 16a of the moving core 16 to the distal end of the valve element 18, is defined.

Once the length d5 is defined, the length d6 which is defined from the open end of the through hole 16a of the moving core 16 to the open end of the receiving space 12a is defined by the predetermined length of d0 which is defined from a distal end of the valve element 18 to the open end portion of the body member 12. For example, the d0, d5 and d6 satisfy an equation d0=d5+d6.

Accordingly, once the length d1 is defined, the length d5 and d6 are defined. Therefore, the length d2 is defined as following.

Corresponding to the first example, d2 is deviated from an equation d2=d6−d3.

Corresponding to the second example, d2 is deviated from an equation d2=d0−d3−d5.

As described above, the inserting length d2 is calculated by a relation between the inserting length d1 of the valve element 18 and the stroke d3.

Figure 6:
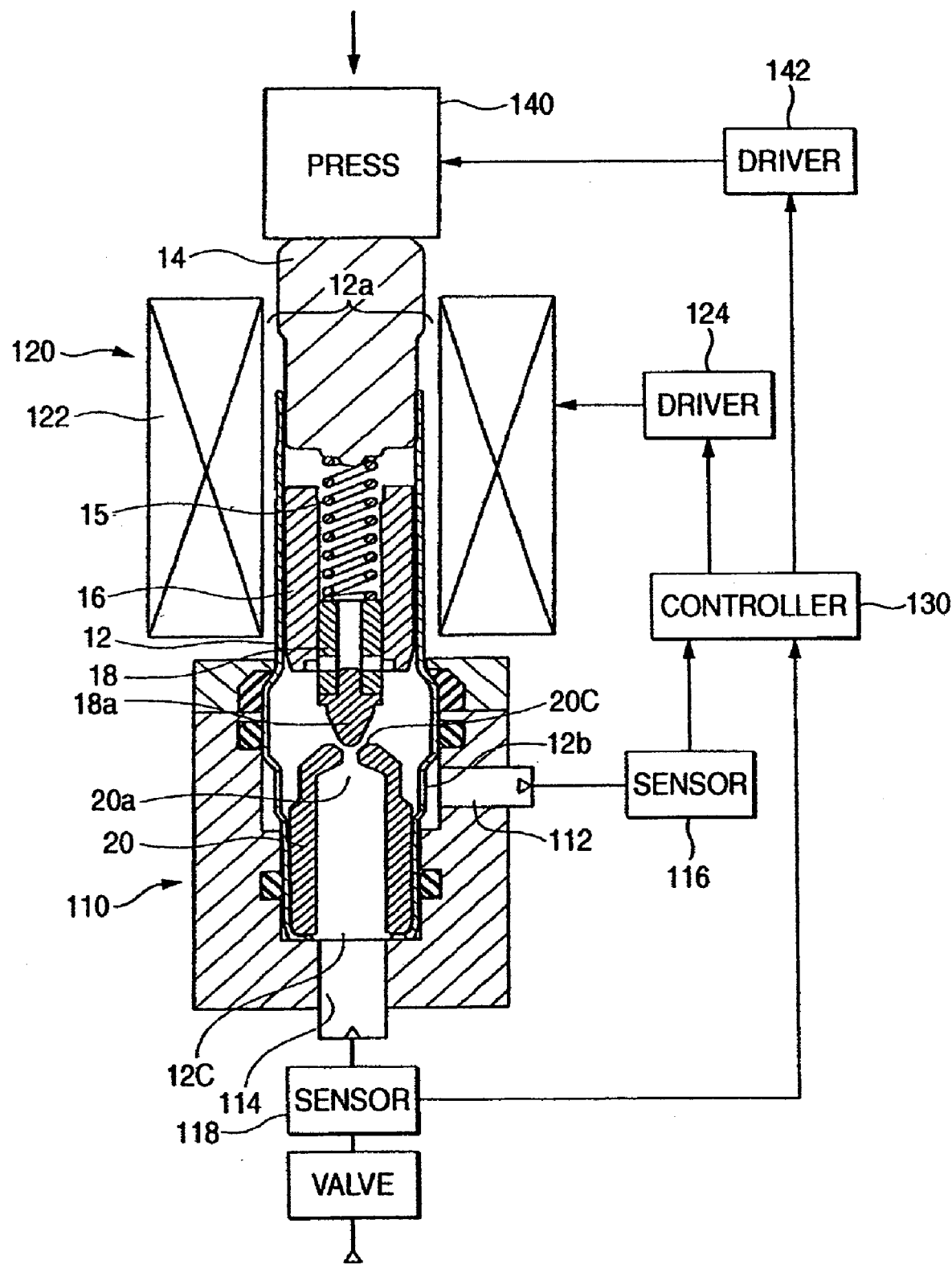
FIG. 6 is a view explanatory of a method of fixing a fixed core to a body member.

FIG. 6 is a view explanatory of a method of fixing the fixed core 14 to the body member 12. The fixed core 14 is provisionally fixed to an inner surface of the receiving space 12a of the body member 12 in opposed relation to the moving core 16 and the resilient member 15. This provisionally-fixing operation is effected by press-fitting the fixed core 14 into the receiving space 12a. This press-fitting is effected in such an amount that the fixed core 14 is provisionally fixed to the body member 12. However, an air-tight or a fluid-tight seal is secured between the body member 12 and the fixed core 14. Namely, an end of the receiving space 12a is closed tightly (air-tight or fluid-tight) by the fixed core 14.

The body member 12, having the valve seat 20, the moving core 16, the valve element 18, the resilient member 15 and the fixed core 14 mounted therein, is set in a fluid measuring instrument 110. The fluid measuring instrument 110 has measuring flow passageways 112 and 114. The measuring flow passageway 112 communicates with a communication hole 12b in the body member 12, and the measuring flow passageway 114 communicates with the communication hole 12c in the body member 12. The measuring flow passageway 112 and the communication hole 12b are tightly (air-tight or fluid-tight) connected together so that the fluid will not leak through this connected portion, and the measuring flow passageway 114 and the communication hole 12c are tightly (air-tight or fluid-tight) connected together so that the fluid will not leak through this connected portion. For this purpose, the fluid measuring instrument 110 has seals.

The fluid measuring instrument 110 includes sensors 116 and 118. The sensor 116 detects characteristics of the fluid flowing through the communication hole 12b (and hence through the measuring flow passageway 112), while the sensor 118 detects characteristics of the fluid flowing through the communication hole 12c (and hence through the measuring flow passageway 114). The sensors 116 and 118 detect at least one of the flow rate and pressure of the fluid.

A magnetic field-producing apparatus 120 is located around the body member 12. The magnetic field-producing apparatus 120 includes a coil 122, and may further include a yoke (not shown) corresponding to the coil casing 42. The magnetic field-producing apparatus 120 is so set as to produce a magnetic field corresponding to a magnetic field produced by the coil 46 of the electromagnetic valve 10.

Figure 7:
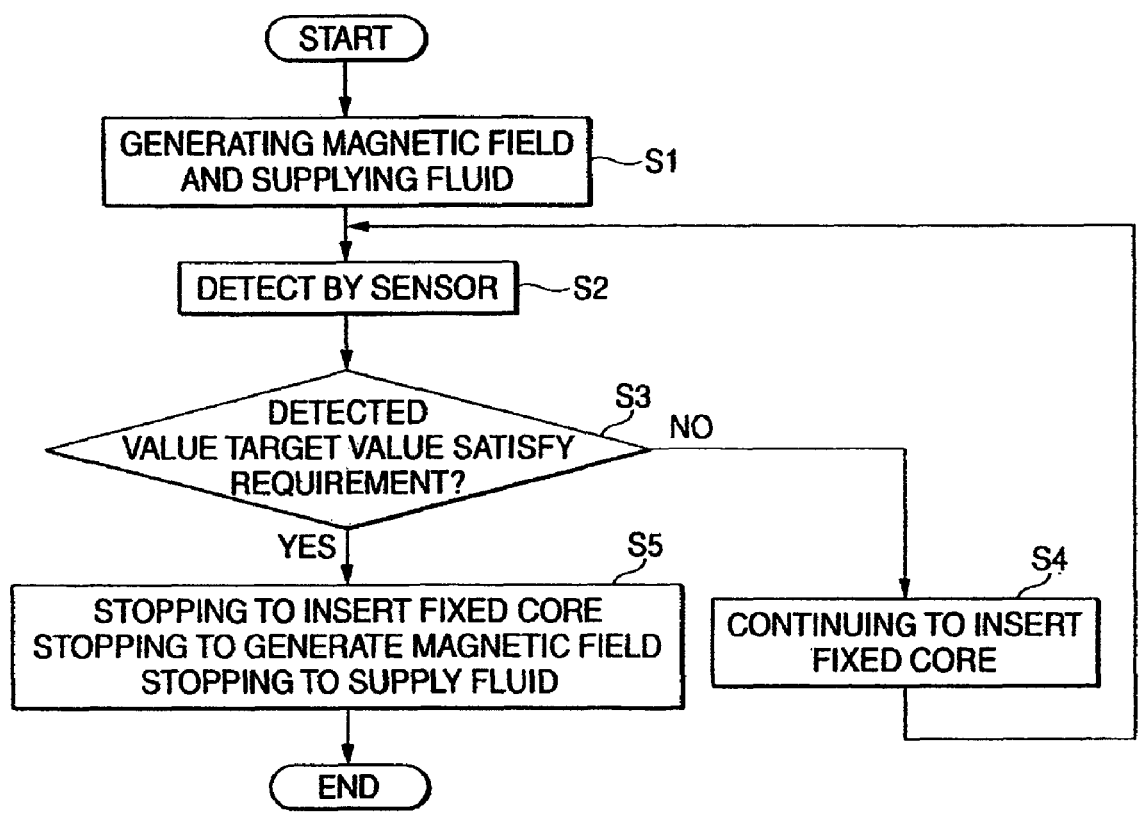
FIG. 7 is a flow chart explanatory of a process of fixing the fixed core to the body member.

FIG. 7 is a flow chart explanatory of the process of fixing the fixed core to the body member. In this embodiment, an electromagnetic attracting force is produced between the moving core 16 and the fixed core 14. When the magnetic field-producing apparatus 120 is driven by a driver 124, an electric current flows through the coil 122 to produce a magnetic field, thereby producing an electromagnetic attracting force (Step S1 in FIG. 7). The magnetic field is so produced that the moving core 16 and the fixed core 14 are disposed within the magnetic circuit. By doing so, the moving core 16 together with the valve element 18 is drawn or attracted toward the fixed core 14 by the electromagnetic attracting force. Thus, the valve element 18 is moved apart from the valve seat 20 by the electromagnetic attracting force.

At this time, the fixed core 14 is merely provisionally fixed to the body member 12, and is not yet fitted into the receiving space 12a in a sufficient amount to be completely fixed to the body member 12. Therefore, the distance between the fixed core 14 and the valve seat 20 is larger as compared with the finished product. Therefore, upon generation of the electromagnetic attracting force, the valve element 18 is moved a larger distance apart from the valve seat 20 (that is, the valve is opened to a larger degree) as compared with the finished product.

In this valve-open condition, a fluid is supplied to flow through the flow hole 20a of the valve seat 20 and the communication holes 12b and 12c of the body member 12 (Step S1 in FIG. 7). The fluid is supplied by a pump (not shown). The fluid may be supplied under a constant pressure, for example, by the use of a regulator. The fluid is supplied from the communication hole 12c (that is, from the measuring flow passageway 114). In this embodiment, although the fluid, used in this production process, is gas, it may a fluid. The supply of the fluid may be started after the generation of the magnetic field (the supply of electric current), or the supply of the fluid and the generation of the magnetic field (the supply of electric current) may be started at the same time, or the supply of the fluid may be started before the generation of the magnetic field (the supply of electric current).

Detection by the sensors is effected as shown in Step S2 in FIG. 7. There are a plurality of examples of this detection.

In a first example, the flow rate of the fluid is detected. In this case, at least one of the sensors 116 and 118 is a flow meter. The fluid is supplied from the communication hole 12c (and hence from the measuring flow passageway 114), and the flow rate of the fluid at a region downstream of the valve (i.e., the flow hole 20a of the valve seat 20) is measured by the sensor 116 serving as the flow meter. In this case, the upstream sensor 118, disposed upstream of the valve, may be omitted, or may be a pressure gauge for supplying the fluid under a constant pressure.

In a second example, the pressure of the fluid at a region upstream of the valve (i.e., the flow hole 20a of the valve seat 20) and the pressure of the fluid at a region downstream of the valve are measured by the sensors, respectively. In this case, each of the sensors 116 and 118 is a pressure gauge. And, a pressure differential of the fluid is detected (or calculated). The calculation of the pressure differential is effected by the use of a controller 130 (see FIG. 6).

In either of the examples, the spacing (distance) between the fixed core 14 and the valve seat 20 is not yet adjusted, and therefore when the valve-opening operation is effected, the valve is opened to a larger degree as compared with the finished product (electromagnetic valve 10). Therefore, the detected value (the flow rate or the pressure differential) is different from a target value. Here, the target value is a value obtained by taking measurements with respect to the finished product (electromagnetic valve 10), and the target value is obtained by beforehand taking measurements, by effecting a simulation or by theoretical calculations.

Computation is effected to determine whether or not the detected value (the flow rate or the pressure differential) satisfies the requirement (Step S3 in FIG. 7). This computation is effected by the use of the controller 130 (see FIG. 3).

In the first example (in which the flow rate of the fluid is detected), the detected value (the flow rate) is compared with the target value (the target flow rate). Then, computation is effected to determine whether or not the requirement that the detected value (the flow rate) is equal to the target value (the target flow rate) is satisfied. At first, the valve is opened to the larger degree, and therefore the detected value (the flow rate) exceeds the target value (the target flow rate) (Namely, the requirement is not satisfied).

In the second example (in which the pressure differential is detected), the detected value (the pressure differential) is compared with the target value (the target pressure differential). Then, computation is effected to determine whether or not the requirement that the detected value (the pressure differential) is equal to the target value (the target pressure differential) is satisfied. At first, the valve is opened to the larger degree, and therefore the detected value (the pressure differential) is below the target value (the target pressure differential) (Namely, the requirement is not satisfied).

When the requirement is not satisfied, the fixed core 14 is further press-fitted to advance toward the valve element 18 against the bias of the resilient member 15. This press-fitting operation is effected by operating a pressing machine (for example, a servo press) 140 by a driver 142 as shown in FIG. 6 (see Step S4 in FIG. 7). By thus press-fitting the fixed core 14 in the advancing direction, the valve element 18 can be moved toward the valve seat 20 through the resilient member 15. As a result, the valve element 18 is moved close to the valve seat surface 20c (the opening in the flow hole 20a), so that the valve is throttled.

Then, Steps S2 and S3 (FIG. 7) are further effected, and when the requirement is not satisfied, Step S4 is effected.

When the requirement is satisfied, a control is effected to stop the press-fitting of the fixed core 14 in the advancing direction (see Step S5 in FIG. 7). In the first example (in which the flow rate is detected), to satisfy the requirement means that the detected value (the flow rate) is equal to the target value (the target flow rate), and in the second example (in which the pressure differential is detected), to satisfy the requirement means that the detected value (the pressure differential) is equal to the target value (the target pressure differential). Namely, the requirement is satisfied when the characteristics required for the finished product (electromagnetic valve 10) are achieved.

The generation of the magnetic field is stopped, and also the supply of the fluid is stopped as shown in Step S5 in FIG. 7. The above controls can be all effected by an automatic control.

In this embodiment, even when there are a variation in the load applied from the resilient member and a variation in the electromagnetic attracting force because of a manufacturing tolerance of the parts or an error in the assembling of the parts, the flow rate (or the pressure differential) at the time of opening the valve can be set to the target value, and therefore the precision of the electromagnetic valve can be kept to a predetermined level.

After the press-fitting of the fixed core 14 in the advancing direction is controlled as described above, the fixed core 14 is fixedly secured to the body member 12 by welding (such for example as laser welding).

As described above, in the production method of this embodiment, in the step of fixedly press-fitting the valve element 18 into the through hole 16a in the moving core 16 and in the step of inserting the fixed core 14 into the receiving space 12a of the body member 12 and fixing the fixed core 14 to the body member 12, the amount d1 of press-fitting of the valve element 18 is adjusted according to the resilient characteristics of the spring member 15, and the amount d2 of insertion of the fixed core 14 is determined according to the amount d1 of press-fitting of the valve element 18. By doing so, the influence of the variation of the characteristics of the spring member 15 (which could not be adjusted only by improving the precision of working of the parts) on the urging force of the spring member 15 in the valve-closed condition can be reduced. Therefore, in the production method of this embodiment, the urging force applied to the moving core 16, that is, the load applied from the spring member 15 to the end portion 18c of the valve element 18, can be set to the predetermined value, and there can be produced the normally-closed electromagnetic valve 10 capable of achieving the pressure regulation control of high precision.

And besides, it has heretofore been necessary to prepare the coil 46 of a large size for producing an electromagnetic attracting force, beforehand taking a variation in characteristics of the spring member 15 into consideration, in order to secure a sufficient output margin of the coil. In the production method of this embodiment, however, the urging force of the spring member 15 is set to the predetermined value at the stage at which the parts are assembled together, and therefore the coil 46 can be formed into a compact size.

Although the preferred embodiment of the present invention has been described above, the present invention is not limited to the above embodiment, and various modifications can be made within the scope of the present invention. For example, the normally-closed electromagnetic valve 10 of the above embodiment can be applied not only to the vehicle anti-lock brake control apparatus but also to other various hydraulic apparatuses.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A normally-closed electromagnetic valve comprising:
   a body member having a receiving space extending therethrough;
   a fixed core mounted to the body member so as to close one end portion of the receiving space;
   a valve seat fixed to the other end portion of the receiving space;
   a moving core opposing to the fixed core and sliding within the receiving space;
   a resilient member urging the moving core toward the valve seat;
   a valve element which is mounted on the moving core so as to move forward and backward together therewith, and is capable of abutting against the valve seat;
   a coil exciting the fixed core so as to produce an attracting force between the fixed core and the moving core;
   wherein the moving core has a through hole extending therethrough from a fixed core-side thereof to a valve seat-side thereof,
   the valve element is inserted into the through hole from the valve seat-side and is press-fitted thereto, at least a part of the resilient member is inserted into the through hole of the moving core from the fixed core-side, the resilient member is compressed between a moving core-side end of the fixed core and a fixed core-side end of the valve seat, the moving core has a resilient member receiving portion into which the resilient member is inserted from the fixed-core side, the valve element has a communication portion in an internal space of the body member which communicates the valve-seat side and the fixed core-side of the moving core with each other, and the communication portion of the valve element comprises a passage communicating with a space formed by the valve seat and the moving core.

2. The normally-closed electromagnetic valve according to claim 1, wherein an urging force of the resilient member to the moving core in accordance with characteristics of the resilient member is applied a predetermined value by an inserting length of the resilient member.

3. The normally-closed electromagnetic valve according to claim 1, wherein in a valve-closed condition in which the valve element abuts against the valve seat, a flow passage which fluid flows in a direction opposite to an urging direction of resilient member is shut off.

4. The normally-closed electromagnetic valve according to claim 1, wherein the communication portion formed in the valve element provides fluid to the resilient member receiving portion.

5. The normally-closed electromagnetic valve according to claim 4, wherein the valve seat-side of the moving core communicates with the resilient member receiving portion via the communication portion so that a pressure differential between the fixed core-side and valve seat-side of the moving core is eliminated.

6. The normally-closed electromagnetic valve according to claim 4, wherein the communication portion is a hole formed in the interior of the valve element.

7. The normally-closed electromagnetic valve according to claim 1, wherein the communication portion formed in the valve element provides communication between the fixed core-side and the valve seat-side of the moving core.

8. The normally-closed electromagnetic valve according to claim 7, wherein the communication portion eliminates a pressure differential which would otherwise be produced by fluid filled in a space between the moving core and the valve seat by sending the fluid to the resilient member receiving portion.

9. The normally-closed electromagnetic valve according to claim 8, wherein the communication portion prevents a pressure differential from developing between the fixed core-side and valve seat-side of the moving core, so that the moving core can be smoothly moved forward and backward.

10. The normally-closed electromagnetic valve according to claim 9, wherein the communication portion eliminates the pressure differential such that an electromagnetic attracting force acting between the moving core and the fixed core in a valve-opening operation is increased.

11. The normally-closed electromagnetic valve according to claim 1, wherein the valve element is fixedly press-fitted in a through hole in the moving core by an inserting distance d1 to form the resilient member receiving portion.

12. The normally-closed electromagnetic valve according to claim 11, wherein the inserting distance d1 corresponds to a spring constant of the resilient member so that an urging force applied by the resilient member to the moving core is at a predetermined value.

13. The normally-closed electromagnetic valve according to claim 1, wherein the resilient member receiving portion serves as a space for the resilient member and eliminates a pressure differential between the opposing sides of the moving core.

14. The normally-closed electromagnetic valve according to claim 1, wherein the communication portion is positioned between the resilient member receiving portion and the space formed by the valve seat and the moving core.

15. The normally-closed electromagnetic valve according to claim 1, wherein the passage begins above an abutment surface of the valve element that abuts against the valve seat.

16. A normally-closed electromagnetic valve comprising:
a fixed core mounted to a body member so as to close one end portion of a receiving space;
a valve seat fixed to the other end portion of the receiving space;
a moving core opposing to the fixed core and sliding within the receiving space;
a fixed core so as to produce an attracting force between the fixed core and the moving core;
a resilient member housed within a resilient member receiving portion, the resilient member urging the moving core toward the valve seat;
a valve element mounted on the moving core at a distance d1 which corresponds to a spring constant of the resilient member so that an urging force applied by the resilient member to the moving core is at a predetermined value; and
a communication portion of the valve element comprising a passage communicating with an internal space of the body member and which is in fluid communication with the resilient member receiving portion, wherein
the communication portion is positioned between the resilient member receiving portion and a space formed by the valve seat and the moving core, and
the communication portion of the valve element comprises a passage communicating with the space formed by the valve seat and the moving core.

17. The normally-closed electromagnetic valve according to claim 16, wherein the resilient member receiving portion receives fluid from the communication portion of the valve element to thereby eliminate a pressure differential between the fixed core-side and valve seat-side of the moving core.

18. The normally-closed electromagnetic valve according to claim 16, further comprising a filter in a first fluid passageway so as to prevent impurities from flowing into the interior of the normally-closed electromagnetic valve.

* * * * *